Dec. 22, 1931.    H. T. RUTHERFORD    1,837,924
COOKING APPARATUS
Filed Dec. 23, 1930    3 Sheets-Sheet 1
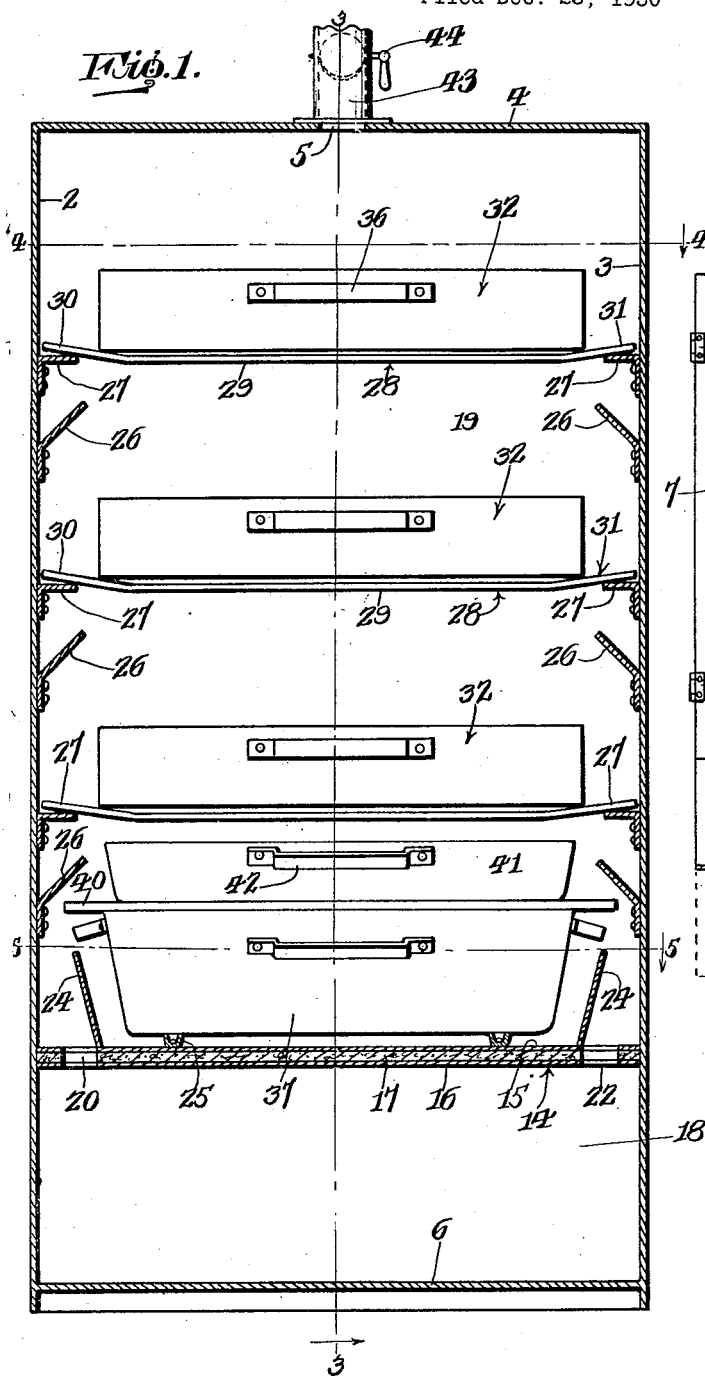
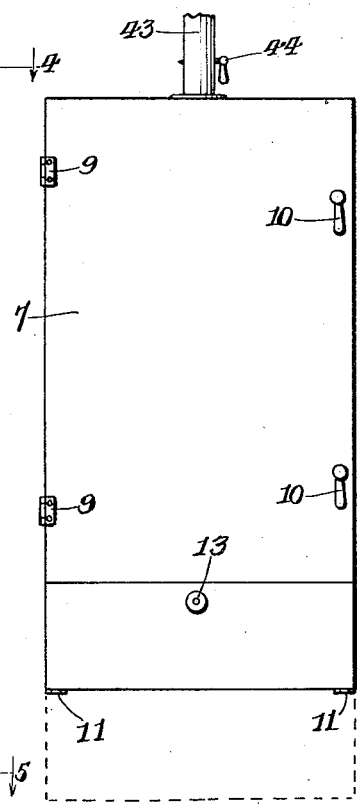
INVENTOR.
H. T. Rutherford
BY
Geo. P. Kimmel
ATTORNEY.

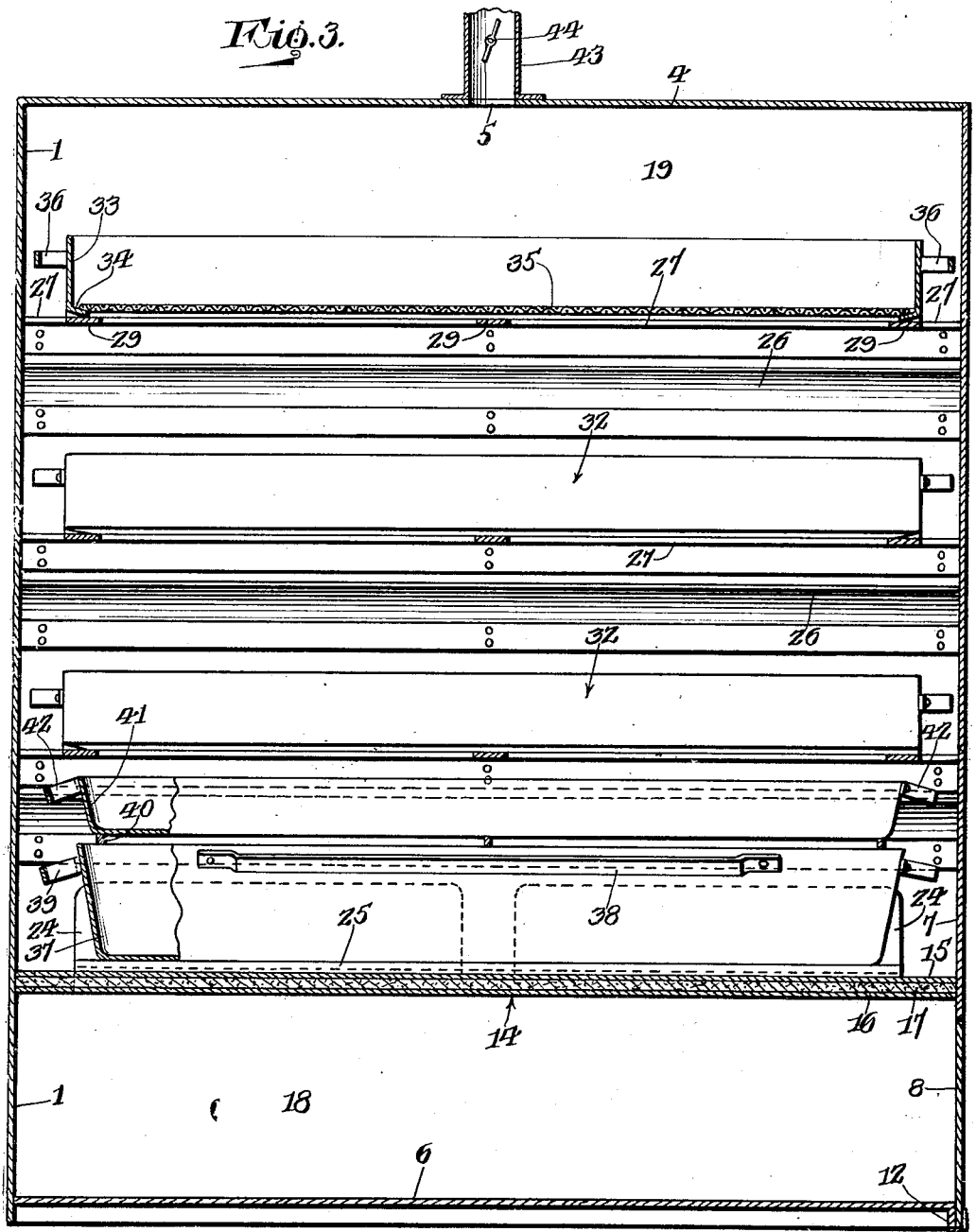

Dec. 22, 1931. H. T. RUTHERFORD 1,837,924
COOKING APPARATUS
Filed Dec. 23, 1930 3 Sheets-Sheet 3
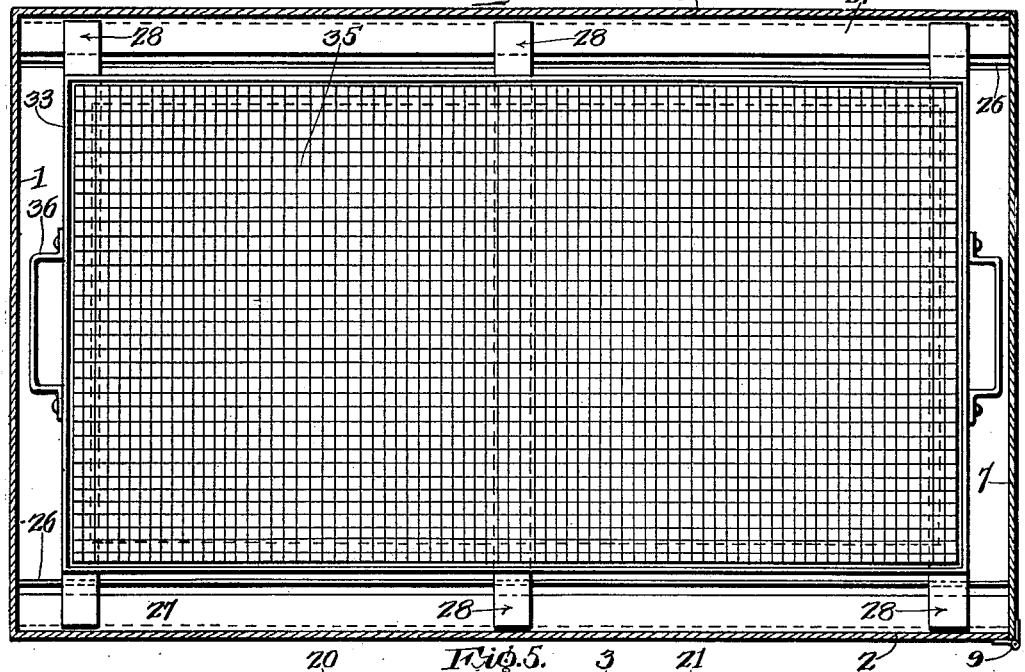
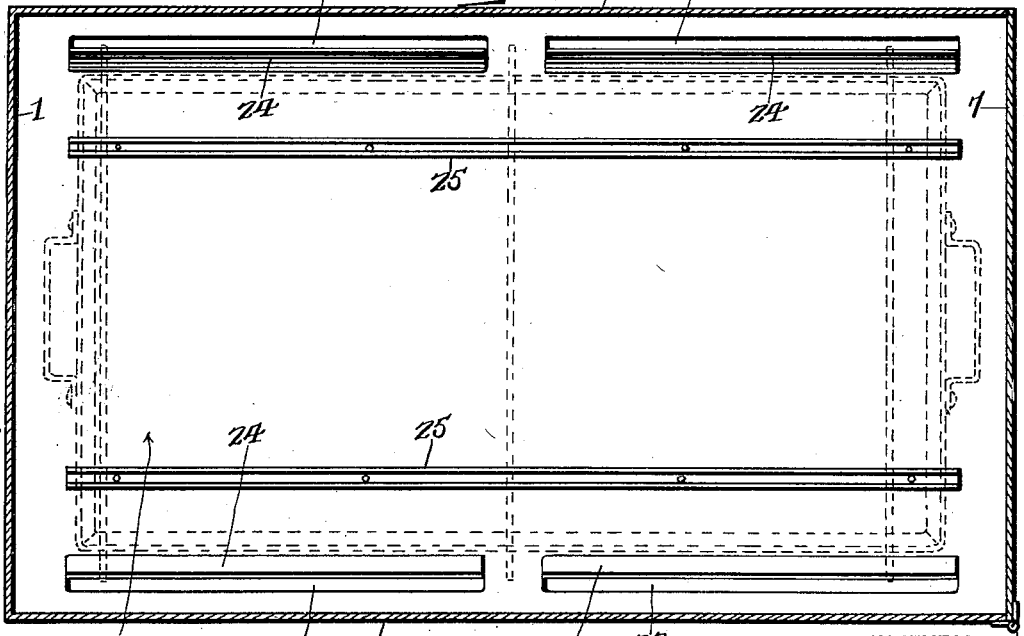
INVENTOR.
H. T. Rutherford
BY
Geo. P. Kimmel
ATTORNEY.

Patented Dec. 22, 1931

1,837,924

UNITED STATES PATENT OFFICE

HESSIE T. RUTHERFORD, OF KANSAS CITY, MISSOURI, ASSIGNOR TO RUTHERFORD FOOD CORPORATION, OF KANSAS CITY, MISSOURI, A CORPORATION OF MISSOURI

COOKING APPARATUS

Application filed December 23, 1930. Serial No. 504,349.

This invention relates to a cooking apparatus and has for its object to provide, in a manner as hereinafter set forth, for barbecuing in a cleanly and sanitary way meats, vegetables, cereals, fowls, game and other food to improve the taste of the barbecued article, as well as reducing fire risk to a minimum.

A further object of the invention is to provide, in a manner as hereinafter set forth, an apparatus for the purpose referred to so constructed and arranged for efficiently barbecuing a food product by the utilization cojointly of heat radiation, smoke and steam.

A further object of the invention is to provide, in a manner as hereinafter set forth, an apparatus for the purpose referred to so constructed and arranged for producing a highly improved and most appetizing barbecued food product by the utilization cojointly of heat radiation, smoke and steam.

A further object of the invention is to provide, in a manner as hereinafter set forth, an apparatus for the purpose referred to so constructed and arranged to prevent the food while being barbecued from shrinking and from becoming crisp and dry and further to provide for the penetration of the heat and smoke flavor into the food resulting thereby in a highly improved and most appetizing barbecued food product.

Further objects of the invention are to provide, in a manner as hereinafter set forth, a cooking apparatus for the purpose referred to which is comparatively simple in its construction and arrangement, strong, durable, compact, thoroughly efficient for the purpose intended, permitting of the convenient access thereto when occasion requires, readily assembled and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to, which fall within the scope of the claims hereunto appended.

In the drawings wherein like reference characters denote corresponding parts throughout the several views:—

Figure 1 is a vertical sectional view of a cooking apparatus in accordance with this invention, the stack being broken away.

Figure 2 is a front elevation of the apparatus when closed and with the stack broken away.

Figure 3 is a section on line 3—3, Figure 1.

Figure 4 is a section on line 4—4, Figure 1.

Figure 5 is a section on line 5—5, Figure 1.

The apparatus includes a housing or casing formed of an imperforate back wall 1, a pair of imperforate side walls 2, 3, a top wall 4 having a central opening 5, a flanged bottom 6 positioned above the lower edges of the back and side walls, and a front wall formed of an upper and a lower section 7, 8 respectively, the former being of a materially greater height than the latter. The section 7 provides an oven door and the section 8 a door for a wood roasting or smoke producing chamber. The said oven and smoke producing chamber will be presently referred to. The section 7 is hinged as at 9 at one side thereof to the side wall 2 and carries in proximity to the other side thereof a pair of combined handles and latching elements 10 which coact with conventional means, not shown, on the side wall 3 for latching the oven door in closed position. The section 8 is hinged, at its lower edge, as at 11 to the flange 12 which depends from the front of the bottom 6. The section 8 is provided with a combined handle and latching element 13 near its top and said element 13 is employed for latching the section 8 in closed position.

The housing in sectional plan is of rectangular contour, and arranged therein at a point between its transverse median and bottom 6, as well as being secured to the inner faces of the back and side walls of the housing is a rectangular composite partition member 14 formed of spaced upper and lower metallic plates 15, 16 separated by an asbestos filler 17. The member 14 is flush with the free edges of the side walls 2, 3. The member 14 in connection with the bottom 6 and back and side walls of the housing provides a semi-vacuum wood roasting or smoke producing chamber 18 which when the apparatus is functioning is closed by the section 8 of the front wall of the housing.

The member 14 in connection with the back, top and side walls of the housing provides an oven 19 of materially greater height than chamber 18 and which is closed by the section 7 of the front wall.

The partition member 14 in proximity to one lengthwise edge is formed with a pair of endwise opposed lengthwise extending spaced slots 20, 21 and in proximity to its other lengthwise edge is formed with a pair of endwise opposed spaced lengthwise extending slots 22, 23 for establishing communication between the chamber 18 and oven 19.

Coextensive with the inner side wall of each of said slots and projecting upwardly from the plate 15 is a deflector 24. The deflectors 24 which project upwardly from the inner side walls of slots 20, 21 incline towards one side wall of the housing. The deflectors which project upwardly from the inner side walls of the slots 22, 23 incline towards the section 7 of the other side wall of the housing.

Secured upon the upper face of the plate 15 between the deflectors and extending lengthwise of such plate is a pair of spaced tracks 25, for a purpose to be presently referred to.

The oven 19 has the side walls thereof provided with inwardly extending upwardly inclined deflectors. The deflectors secured to each side wall of the oven 19 are arranged in sets. The deflectors of each set are positioned in superposed spaced relation.

Secured to the inner face of each side wall of the oven 19 is a set of supports. The supports of each set are arranged in spaced relation and the deflectors of a set are alternately disposed with respect to the supports of a set. Each deflector is arranged below a support and in proximity thereto. The deflectors 26 project inwardly beyond the supports.

The supports of one set align with the supports of the other set and mounted upon the aligning supports are sets of spaced suspension members 28. Each set of suspension members preferably consists of three in number. Each suspension member comprises an intermediate part 29 and a pair of upwardly extending inclined oppositely disposed end parts 30, 31. The end parts 30, 31 of a suspension member are mounted upon a pair of aligning supports 27 whereby the intermediate part 29 will be positioned below the end parts 30, 31.

Each set of suspension members 28 provides means for suspending a food containing tray 32 within the oven 19. Each food containing tray 32 comprises a body portion 33 having its lower end formed with an inwardly extending downwardly inclined flange 34. The body portion 33 is secured to the inclined parts 30, 31 of the suspension members of the set and the flanges 34 of the body portion 33 extend to the intermediate parts 29 of the suspension members of the set. Each food containing tray 32 also includes a reticulated bottom 35 which seats on the flange 34 whereby said bottom 35 is elevated with respect to the intermediate part 29 of each suspension member of a set. Each tray 32 is of rectangular contour and has projecting from the end walls of body portion 33 handles 36.

Arranged between the deflectors 24 and seated on the tracks 25 is a flared water container 37 of pan like form provided at its sides with handle members 38 and at its ends with handle members 39. Positioned upon the top edge of the container 37 as well as extending transversely thereof is a series of combined supporting and spacing bars 40 upon which is mounted a flared gravy collector 41 of pan like form and which has its ends provided with handle members 42.

The opening 5 provides an outlet for the oven 19 and which communicates with a stack 43 provided with a damper 44.

The housing is adapted to be placed upon a gas plate or upon any stove or fire pit having as its source heat, gas, electricity, wood, coal, kerosene or any other kind of fuel.

The purpose of the chamber 18 is to burn the wood or coal arranged therein without developing a flame and this is accomplished by excluding draughts of air resulting in only smoke or heat emitted from chamber 18 through the slots 20, 21, 22 and 23.

The partition 14 acts as a heat break and which is further augmented by the employment of the tracks upon which the water container 37 is mounted.

The water within the container is generated into steam and when the smoke and heat passes through the partition member 14 it comingles with the steam from the water pan. The steam from the water pan or container escapes from the container through the opening between the latter and the gravy collector or pan 41.

As the bottoms of the food containing trays are of reticulated form the food in each tray will be attacked by the heat radiation, smoke and steam cojointly whereby the food will be cooked.

The heat radiation and smoke originating in the chamber 18 will pass to the right and left of the water container, deflected in its course upward by the deflectors 26. The deflectors 26 act to throw the heat and smoke and steam vapor immediately under their respective food trays, the heat thus proceeds upward through the reticulated bottoms and at the sides of the food trays enveloping the foods, until it finally passes through the smoke stack. The steam from the water container prevents the foods from shrinking and from becoming crisp and dry and aids the penetration of the heat and the smoke flavor into the food. The result is a highly improved and most appetizing barbecue food product. The heat radiation and smoke from the chamber 18 will be deflected from direct contact with the water container 37 by the deflectors or baffles 24.

The angularly disposed flanges of the body portions of the food trays and which slope downward both at the sides and ends of said body portions control dripping as they descend in the direction of the gravy collector 41.

The reticulated or wire mesh bottoms of the food trays 32 are removable.

What I claim is:—

1. A cooking apparatus for the purpose set forth comprising a housing provided therein with a partition member to form its lower portion as a normally closed chamber for roasting wood and its remaining portion as a normally closed oven, said member provided with slots for establishing communication between said chamber and oven, supports for suspension members secured to opposed walls of said oven, deflectors anchored to said opposed walls, upwardly extending oppositely inclined spaced baffles carried by the top of said member, and spaced tracks secured upon said member and arranged between said baffles.

2. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, and deflectors secured to said opposed walls and positioned below said bottoms.

3. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, and said bottoms positioned in spaced relation over and with respect to the intermediate parts of said suspension members.

4. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, said tray formed at its sides and ends with inwardly extending sloping flanges, and said reticulated bottoms mounted on said flanges.

5. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, said bottoms positioned in spaced relation over and with respect to the intermediate parts of said suspension members, said tray formed at its sides and ends with inwardly extending sloping flanges, and said reticulated bottoms mounted on said flanges.

6. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, a normally closed wood roasting chamber positioned below and communicating with said oven, a water container mounted on the top of said chamber, upstanding inclined baffles carried by said top and opposing said container, and a collector interposed between said tray and said container and supported from the latter in spaced relation therewith.

7. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, said bottoms positioned in spaced relation over and with respect to the intermediate parts of said suspension members, a normally closed wood roasting chamber positioned below and communicating with said oven, a water container mounted on the top of said chamber, upstanding inclined baffles carried by said top and opposing said container, and a collector interposed between said tray and said container and supported from the latter in spaced relation therewith.

8. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, said tray formed at its sides and ends with inwardly extending sloping flanges, said reticulated bottoms mounted on said flanges, a normally closed wood roasting chamber positioned below and communicating with said oven, a water container mounted on the top of said chamber, upstanding inclined baffles carried by said top and opposing said container, and a collector interposed between said tray and said container and supported from the latter in spaced relation therewith.

9. In a cooking apparatus, an oven, aligning supports secured to opposed walls of said oven, spaced suspension members extending transversely of the oven and each having a pair of end parts and an intermediate part positioned below the end parts, said end parts seated on said aligning supports, a food tray secured to said end parts and having a reticulated bottom, deflectors secured to said opposed walls and positioned below said bottoms, said bottoms positioned in spaced relation over and with respect to the intermediate parts of said suspension members, said tray formed at its sides and ends with inwardly extending sloping flanges, said reticulated bottoms mounted on said flanges, a normally closed wood roasting chamber positioned below and communicating with said oven, a water container mounted on the top of said chamber, upstanding inclined baffles carried by said top and opposing said container, and a collector interposed between said tray and said container and supported from the latter in spaced relation therewith.

10. A cooking apparatus comprising an oven, a semi-vacuum wood roasting chamber communicating therewith, a set of food trays suspended in spaced relation within said chamber and each having a reticulated bottom, deflectors arranged below the bottom of each tray, an open top water container positioned on the top of said chamber, baffles opposing said container, and a collector interposed between the foremost food tray and said container.

11. In a cooking apparatus, an oven, an open top and reticulated bottom food tray suspended in said oven, deflectors positioned in proximity to said bottom, a wood roasting chamber below and communicating at a plurality of points with said oven, baffles extending over said points of communication, an open top water container positioned between said baffles and the bottom of the oven, and an open top collector interposed between said tray and container.

12. A cooking apparatus comprising an oven, a semi-vacuum wood roasting chamber communicating therewith, a set of food trays suspended in spaced relation within said chamber and each having a reticulated bottom, deflectors arranged below the bottom of each tray, an open top water container positioned on the top of said chamber, and baffles opposing said container.

In testimony whereof, I affix my signature hereto.

HESSIE T. RUTHERFORD.